United States Patent [19]
Matsumoto

[11] Patent Number: 5,921,303
[45] Date of Patent: Jul. 13, 1999

[54] PNEUMATIC RADIAL TIRE INCLUDING FINE GROOVE

[75] Inventor: Hiroyuki Matsumoto, Kodaira, Japan

[73] Assignee: Bridgestone Corporation, Tokyo, Japan

[21] Appl. No.: 08/961,015

[22] Filed: Oct. 30, 1997

[51] Int. Cl.$^6$ .............. B60C 11/01; B60C 11/03; B60C 101/00
[52] U.S. Cl. .............. 152/209.14; 152/209.16; 152/209.23; 152/209.27
[58] Field of Search .............. 152/209 R, 209 D

[56] References Cited

U.S. PATENT DOCUMENTS

| | | | |
|---|---|---|---|
| 4,214,618 | 7/1980 | Takigawa et al. | 152/209 R |
| 4,480,671 | 11/1984 | Giron | 152/209 R |
| 4,724,878 | 2/1988 | Kabe et al. | 152/209 R |
| 4,836,257 | 6/1989 | Mamada et al. | 152/209 R |
| 4,957,149 | 9/1990 | Iuchi | 152/209 R |

FOREIGN PATENT DOCUMENTS

| | | |
|---|---|---|
| 791486 | 8/1997 | European Pat. Off. . |
| 3-7604 | 1/1991 | Japan .............. 152/209 R |
| 8-188013 | 7/1996 | Japan . |

*Primary Examiner*—Steven D. Maki
*Attorney, Agent, or Firm*—Sughrue, Mion, Zinn, Macpeak & Seas, PLLC

[57] ABSTRACT

A pneumatic radial tire comprises a pair of bead portions, a pair of sidewall portions, a tread portion, a radial carcass, and a belt, in which the tread portion is comprised of a first tread zone contacting with a flat road surface and a second tread zone projecting toward the side of the first tread zone and contacting with a mountain side of a slant road surface. A half-width ($TW_1$) of the first tread zone and a width ($TW_2$) of the second tread zone satisfy $TW_2/TW_1 > 2.0 \times 10^{-2}$. Further, fine grooves are arranged in at least one of both side end vicinities of the first tread zone so that a widthwise opening center of the fine groove is located within a range of 0.8 $TW_1$ to 0.9 ($TW_1 + TW_2$) separated from the equatorial plane of the tire toward the side end of the first tread zone.

4 Claims, 6 Drawing Sheets

FIG_1
PRIOR ART
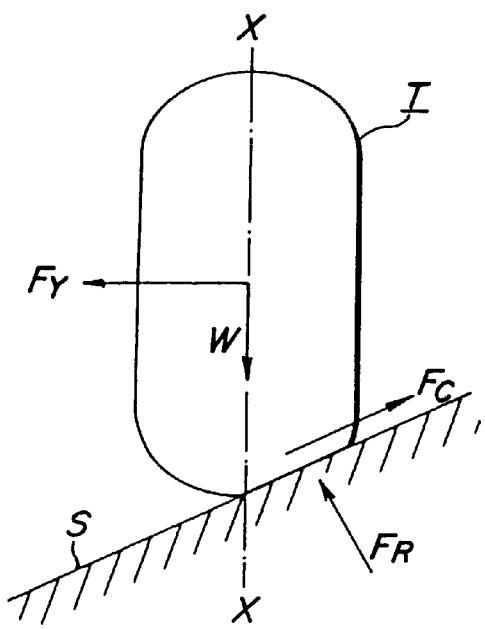
FIG_2
PRIOR ART
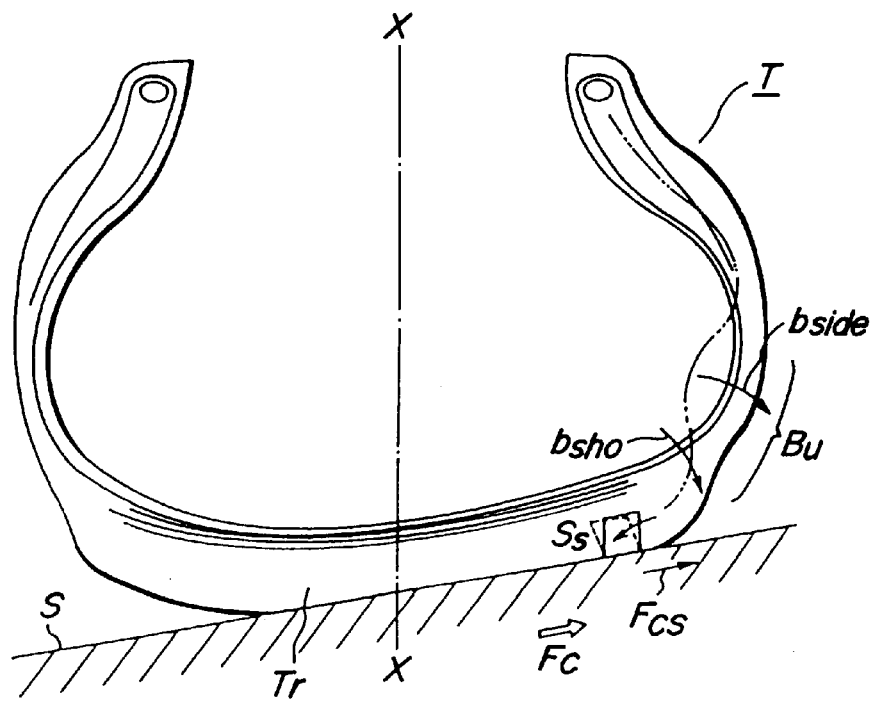

FIG_5a
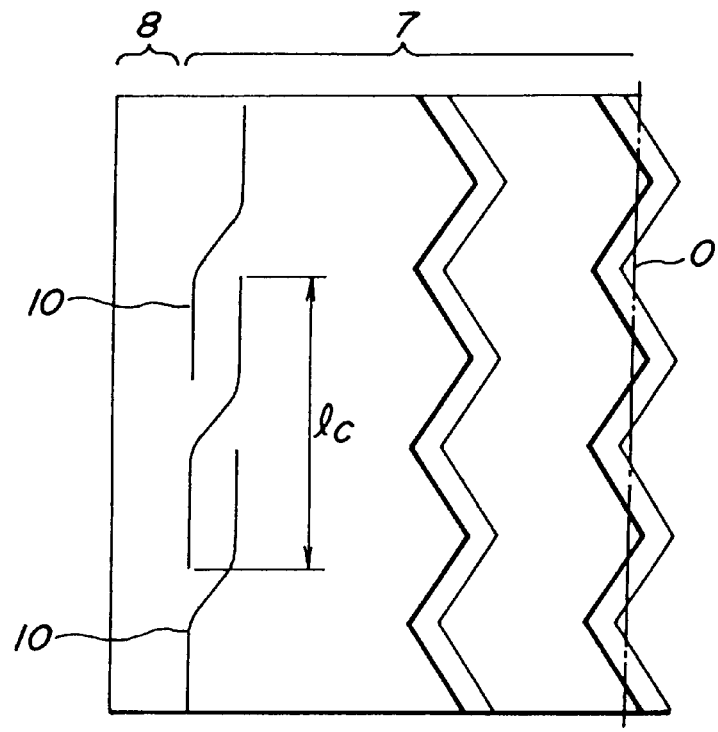
FIG_5b
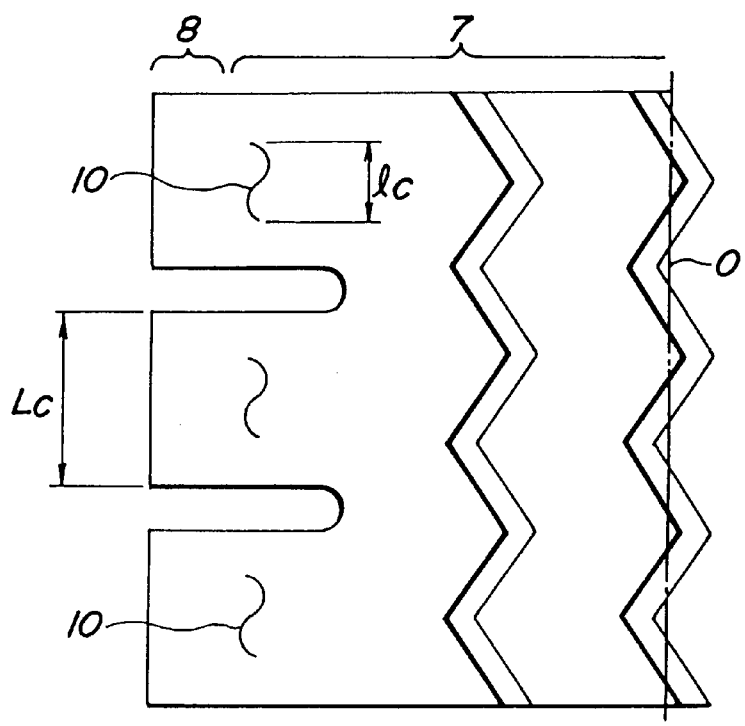

PNEUMATIC RADIAL TIRE INCLUDING FINE GROOVE

BACKGROUND OF THE INVENTION

1. Field of the Invention

This invention relates to a pneumatic radial tire controlling a complicated motion of the tire exceeding a driver's forecast or an occurrence of so-called wandering phenomenon to largely improve straight running stability when a vehicle is run on a slant face of an uneven road surface such as rut or the like.

2. Description of Related Art

The radial tire is excellent in the wear resistance and the steering stability because carcass cords are arranged to extend substantially in a direction perpendicular to an equatorial plane of the tire. Therefore, radial tires are frequently used as compared with bias tires in not only passenger cars but also vehicles such as small-size truck, truck and bus and the like with a recent advance of high-speed performance of the vehicle.

However, high-speed running of the vehicles is daily carried out in accordance with the improvement and expansion of road systems and the like. For this end, it is strongly demanded to sufficiently control the wandering phenomenon liable to be caused in the radial tire rather than the bias tire to thereby enhance the straight running stability of the radial tire and to further improve safety.

Viewing the occurrence of wandering phenomenon in the radial tire, as shown in FIG. 1, when the tire T is rotated on a slant face S of rut or the like, each of load W, reaction force $F_R$ from road surface and camber thrust $F_C$ is applied to the tire T and hence lateral force $F_Y$ as a sum of horizontal components of these forces acts thereto. The tire of radial structure is high in the treading rigidity as compared with the tire of bias structure, and also the rigidity of the tread portion is fairly higher than that of the side portion owing to the structure of the radial tire, so that the camber thrust $F_C$ is made smaller than that of the bias tire and hence the lateral force $F_Y$ directing to a lower side of the slant face S becomes relatively large by a quantity corresponding to the reduced quantity of the camber thrust $F_C$. As a result, the tire T strongly tends to slip downward on the slant face and it is difficult to ride over the rut and hence the wandering phenomenon is caused.

As shown at radial section of the tire in FIG. 2, when the tire is rotated on the slant face S, the camber thrust $F_C$ is caused based on the fact that the tread portion $T_r$ tends to strongly contact with the ground at an upper side or a mountain side of the slant face S and rise upward at a valley side of the slant face S. Particularly falling-down deformation of a region $B_u$ in the vicinity of the buttress of the tire side portion or so-called bulging deformation bside toward the mountain side is caused at the mountain side due to the strong ground contact of the tread portion $T_r$. This bulging deformation bside brings about bending deformation of the tread portion $T_r$ near a ground contact end or so-called pushing-out deformation bsho, and such a pushing-out deformation bsho in a zone near to the ground contact end further gives shearing deformation $S_S$ as shown by dotted lines in FIG. 2 to the tread rubber in a portion near to the ground contact end. This shearing deformation $S_S$ creates a lateral force $F_{CS}$ directing to the upper side of the slant face S.

As regards the camber thrust $F_C$, in the bias tire having a small difference of rigidity among constitutional parts of the tire and a relatively soft structure, sufficiently large bulging deformation bside and pushing-out deformation bsho can be insured and hence the camber thrust $F_C$ becomes large. Since the rigidity of the tread portion in the radial tire becomes considerably higher than the rigidity of the side portion, a tendency of creating escape deformation in a direction opposite to the above as exaggeratedly shown by a phantom line in FIG. 2 becomes strong in the tire side portion and hence the shearing deformation $S_S$ of the tread rubber becomes naturally small and it is obliged to reduce the camber thrust $F_C$.

In order to increase the camber thrust $F_C$ in the pneumatic radial tire, therefore, it is effective that the bulging deformation bside of the region $B_U$ is made large and the transmission efficiency of the bulging deformation bside is enhanced to make the pushing-out deformation bsho in the zone near to the ground contact end to thereby increase the shearing deformation $S_S$ of the tread rubber at the ground contact end, or it is effective that the ground contact area of the tire to the slant face S is made large to increase a total quantity of the lateral force $F_{CS}$ directed to the upper side of the slant face S.

SUMMARY OF THE INVENTION

It is, therefore, an object of the invention to provide pneumatic radial tires sufficiently controlling the occurrence of wandering phenomenon on the slant face of the rut or the like to largely improve straight running stability by increasing the camber thrust of the radial tire without degrading the properties inherent to the radial tire.

According to the invention, there is the provision of a pneumatic radial tire comprising a pair of bead portions, a pair of sidewall portions, a tread portion toroidally extending between both sidewall portions, a radial carcass reinforcing these portions, and a belt reinforcing the tread portion at the outer circumferential side of the radial carcass, in which said tread portion is comprised of a first tread zone contacting with a flat road surface and a second tread zone projecting toward the side of the first tread zone and contacting with a mountain side of a slant road surface, and a half-width ($TW_1$) of the first tread zone is a maximum ground contact width from an equatorial plane of the tire on a flat road surface under a normal loading in case of truck and bus tire and under a loading corresponding to 70% of a normal loading in case of tires having a size smaller than that of the truck and bus tire at an inflation state under a normal air pressure in accordance with a maximum loading capacity according to JATMA standard, and a width ($TW_2$) of the second tread zone is a ground contact width extending outward from the half-width ($TW_1$) of the first tread zone in a widthwise direction among the maximum ground contact width from the equatorial plane of the tire on the flat road surface when a camber angle of 10° is applied to the tire under a normal loading in case of truck and bus tire and under a loading corresponding to 70% of a normal loading in case of tires having a size smaller than that of the truck and bus tire at an inflation state under a normal air pressure in accordance with the maximum loading capacity, and both widths ($TW_1$, $TW_2$) satisfy $TW_2/TW_1 > 2.0 \times 10^{-2}$, and further a fine groove continuously or discontinuously extending in the circumferential direction of the tread is arranged in at least one of both side end vicinities of the first tread zone so that a widthwise opening center of the fine groove is located within a range of $0.8\,TW_1$ to $0.9(TW_1+TW_2)$ separated from the equatorial plane of the tire toward the side end of the first tread zone.

In preferable embodiments of the invention, the fine groove has a depth corresponding to not less than ½ of a tread rubber gauge at the fine groove arranged position and an opening width of not more than 3 mm, and a phantom line segment connecting the widthwise opening center of the fine groove to a widthwise bottom center thereof at radial section of the tire is inclined at an angle of not less than 5° with respect to a normal line of an outer surface of the tread drawn at the widthwise opening center outward from the widthwise opening center, and the fine groove has an inside width wider than the opening width, and a surface of an outer region of the tread in the widthwise direction bordering the fine groove is located inward in the radial direction with respect to a surface of an inner region of the tread in the widthwise direction bordering the fine groove.

Moreover, the term "tread rubber gauge" means a gauge of the tread rubber measured on the normal line of the outer surface of the tread drawn at the fine groove arranged position, or a distance from the outer surface of the tread to an outermost belt ply or a carcass ply if the belt is not existent in the respective portion.

BRIEF DESCRIPTION OF THE DRAWINGS

FIG. 1 is a schematic view illustrating a state of generating the wandering phenomenon;

FIG. 2 is a radial section view illustrating a state of generating camber thrust;

FIGS. 5a and 5b are a diagrammatic view showing shapes of a discontinuous fine groove;

DESCRIPTION OF PREFERRED EMBODIMENTS

Figure 3:
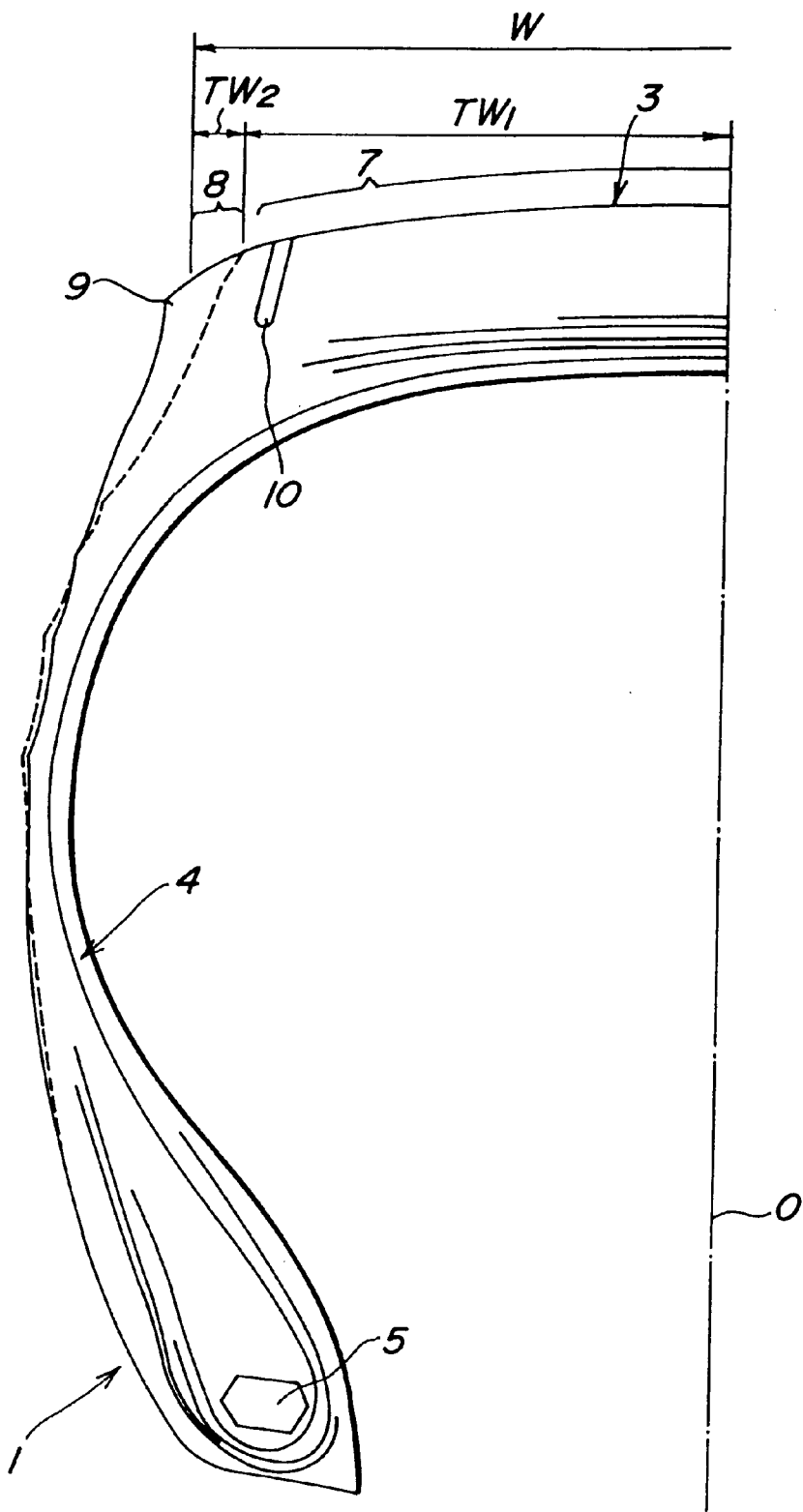
FIG. 3 is a diagrammatically radial left-half section view of an embodiment of the pneumatic radial tire according to the invention.

In the pneumatic radial tire according to the invention, the tread portion is largely projected in the widthwise direction of the tire by a portion corresponding to the second tread zone as compared with the conventionally generic radial tire, whereby the ground contact area during the rotation of the tire on the slant face as shown in FIG. 2 is made larger than that of the conventional tire and hence a total quantity of lateral force $F_{CS}$ directing to the upper side of the slant face S can be increased.

Since the second tread zone projecting in the widthwise direction of the tire has a high rigidity as a part of the tread portion $T_r$, the escape deformation from the portion near to the ground contact end of the tread portion $T_r$ to the tire side portion as exaggeratedly shown by the phantom line in FIG. 2 is effectively prevented to increase the bulging deformation bside. In addition, it is possible to transmit the pushing-out deformation bsho based on the bulging deformation bside to a wide range of the second tread zone contacting with the slant face S, whereby the shearing deformation $S_S$ of the tread portion $T_r$ and hence the camber thrust $F_C$ are effectively increased.

On the contrary, in the radial tire having no second tread zone, the position of the ground contact end can not be moved to the upper side of the slant face in the contact with the slant face of the rut or the like and hence the ground contact pressure at the ground contact end portion and the neighborhood thereof largely rises and also the rigidity ranging from the ground contact end portion to the tire side portion is low, and it is obliged to cause the escape deformation as shown in FIG. 2.

Therefore, the tire having the second tread zone is a tire of radial structure and can effectively enhance lateral force $F_{CS}$ and hence camber thrust $F_C$.

Even in the conventional radial tire, if there is a shoulder shape such as a round shoulder, taper shoulder or the like, when a camber angle of 10° is applied to the tire, a side region of the tread portion may contact with the ground at a width of not more than about 5 mm. However, such a ground contact region is not a ground contacting portion of the tread having a thick rubber gauge and a high rigidity, so that it is impossible to bring about the effect aiming at the invention.

In the pneumatic radial tire according to the invention, an interrelation between the half-width of the first tread zone ($TW_1$) and the width of the second tread zone ($TW_2$) satisfies $TW_2/TW_1 > 2.0 \times 10^{-2}$, so that the ground contact width of the second tread zone when the tire is rotated on the slant face of the rut or the like can sufficiently be ensured to guarantee the effective increase of the camber thrust $F_C$.

Furthermore, in the pneumatic radial tire according to the invention, the fine groove continuously or discontinuously extending in the circumferential direction of the tread is arranged in at least one of both side end vicinities of the first tread zone so that a widthwise opening center of the fine groove is located within a range of 0.8 TW to 0.9($TW_1$+$TW_2$) separated from the equatorial plane of the tire toward the side end of the first tread zone. As a result, the inner surface of the fine groove at the outside of the tire is crushed from the bulging deformation bside when the tire is contacted onto the slant face as shown in FIG. 2 and consequently the shearing deformation $S_S$ of the tread portion $T_r$ and hence camber thrust $F_C$ are effectively increased.

In the tire according to the invention, it is favorable in the practice that (1) the fine groove has a depth corresponding to not less than ½ of a tread rubber gauge at the fine groove arranged position and an opening width of not more than 3 mm, and (2) a phantom line segment connecting the widthwise opening center of the fine groove to a widthwise bottom center thereof at radial section of the tire is inclined at an angle of not less than 5° with respect to a normal line of an outer surface of the tread drawn at the widthwise opening center outward from the widthwise opening center, and (3) the fine groove has an inside width wider than the opening width, and (4) a surface of an outer region of the tread in the widthwise direction bordering the fine groove is located inward in the radial direction with respect to a surface of an inner region of the tread in the widthwise direction bordering the fine groove.

An embodiment of the invention will be described with reference to the drawings.

In FIG. 3 is shown a radial left-half section of a first embodiment of the pneumatic radial tire according to the invention.

In FIG. 3, a solid line shows the invention tire and dotted lines show the conventional tire. In FIG. 3, numerals 1, 2 are a pair of bead portions and a pair of sidewall portions, and numeral 3 a toroidal tread portion extending between both sidewall portions.

Moreover, the term "tire side portion" or "sidewall portion" used in the specification includes the bead portion 1 and the sidewall portion 2, respectively.

Further, numeral 4 is a radial carcass continuously extending from one bead portion 1 to the other bead portion 1. This radial carcass 1 reinforces each of the above portions 1, 2 and 3.

Also, a belt 6 is arranged on an outer peripheral side of a crown portion of the radial carcass 4 to reinforce the tread portion 3.

In this tire, the tread portion 3 is comprised of a first tread zone 7 contacting with a flat road surface during the running of the tire under loading and a second tread zone 8 projecting sideward from the first tread zone 7 and contacting with a mountain side of a slant road surface.

Concretely, the first tread zone 7 is a maximum width region of a ground contact portion of the tire on the flat road surface under a normal loading in case of truck and bus and under a loading corresponding to 70% of a normal loading in case of tires having a size smaller than that of the truck and bus tire at an inflation state under a normal air pressure in accordance with a maximum loading capacity according to the JATMA standard.

Now, the loading condition used herein is determined by considering the magnification and frequency of load actually applied to the tire, and is based on the fact that a maximum load is frequently loaded in the truck and bus and a load corresponding to about 70% of the maximum load is loaded in vehicles other than the above.

Furthermore, the second tread zone 8 is a region extending outward from the first tread zone in a widthwise direction in the maximum width region of the ground contact portion of the tire on the flat road surface when a camber angle of 10° is applied to the tire under normal loading in case of truck and bus tire and under a loading corresponding to 70% of a normal loading in case of tires having a size smaller than that of the truck and bus tire at an inflation state under a normal air pressure in accordance with the maximum loading capacity.

The reason why the camber angle of 10° is given to each of the tires is based on the knowledge that when examining tire behavior during the running on the rut in detail, the deformation state on the slant face of the rut is substantially the same as that in the application of camber angle of 10° to the tire.

In the tire according to the invention, the interrelation between the half-width of the first tread zone 7 ($TW_1$) and the width of the second tread zone 8 ($TW_2$) is $TW_2/TW_1 > 2.0 \times 10^{-2}$ when the half-width $TW_1$ of the first tread zone 7 is a maximum ground contact width from an equatorial plane of the tire on the flat road surface under the normal loading in case of truck and bus tire and under a loading corresponding to 70% of the normal loading in case of tires having a size smaller than that of the truck and bus tire at an inflation state under the normal air pressure in accordance with the maximum loading capacity. The width $TW_2$ of the second tread zone 8 is a ground contact width extending outward from the half-width $TW_1$ of the first tread zone 7 in the widthwise direction among the maximum ground contact width from the equatorial plane of the tire on the flat road surface when a camber angle of 10° is applied to the tire under the normal loading in case of truck and bus tire and under a loading corresponding to 70% of the normal loading in case of tires having a size smaller than that of the truck and bus tire at an inflation state under the normal air pressure in accordance with the maximum loading capacity.

When the tire having such a structure is run on the slant face S as shown in FIG. 2 under loading, the ground contact area can be increased by a region of ground contact width of the second tread zone 8 owing to the presence thereof as compared with the conventional radial tire, whereby lateral force $F_{CS}$ directing to the upper side of the slant face S and hence camber thrust $F_C$ can directly be increased.

Also, the second tread zone 8 of high rigidity not only prevents the escape deformation of a portion near to the buttress but also positively contributes to the increase of the pushing-out deformation of a portion near the ground contact end as previously mentioned, whereby the effective increase of camber thrust $F_C$ can be realized.

In this case, when the width $TW_2$ of the second tread zone 8 is not more than $2.0 \times 10^{-2}$ to the half-width $TW_1$ of the first tread zone 7, the ground contact width of the second tread zone 8 can not sufficiently be ensured when the tire is rotated on the slant face under loading and hence the increase of camber thrust $F_C$ can not be expected if necessary. Moreover, in order to sufficiently contact the second tread zone 8 with ground, it is favorable that the radius of curvature of the second tread zone at radial section is not less than 30 mm.

As shown in FIG. 3, when a reinforcing portion 9 projecting sideward from a side end of the second tread zone 8 is further formed, this reinforcing portion 9 functions to enhance the strength and rigidity of the second tread zone 8 and the buttress portion to thereby increase the bulging deformation bside under the improved reinforcing action, which can contribute to an increase in the camber thrust $F_C$.

When such a reinforcing portion 9 is continuously arranged in an annular form in the circumferential direction of the tire or at slight intervals in the circumferential direction through slits having a narrow width or the like, the function inherent thereto can effectively be developed. Furthermore, in order to effectively suppress the increase of tire weight while maintaining the reinforcing effect by the reinforcing portion 9, it is favorable that the reinforcing portion 9 is comprised of plural ribs arranged at relatively large intervals in the circumferential direction of the tire.

Figure 4:
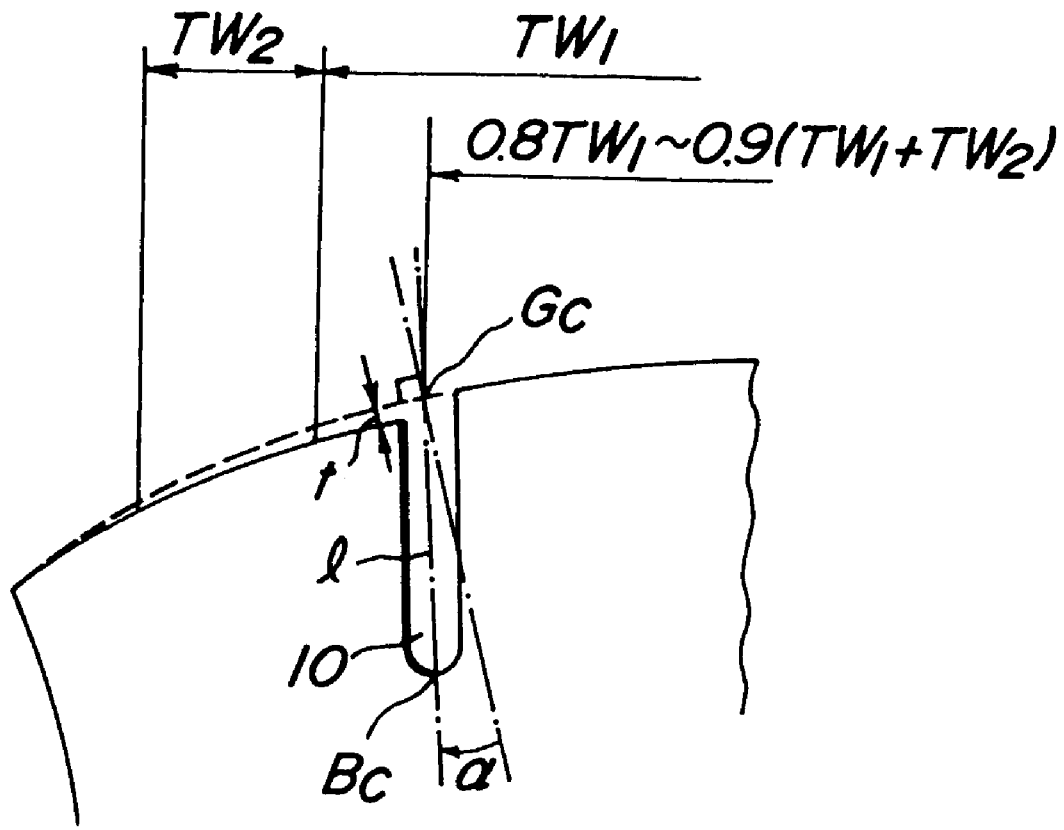
FIG. 4 is a diagrammatically enlarged view of a fine groove and its environs.
Figure 6:
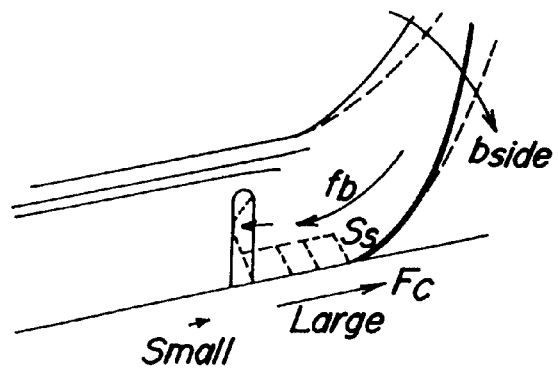
FIG. 6 is a radial section view illustrating a state of generating camber thrust.

In the tire according to the invention, the camber thrust $F_C$ is more effectively increased by arranging a fine groove 10 continuously or discontinuously extending in the circumferential direction of the tread in the vicinity of at least one side end of the first tread zone 7, preferably each side end thereof. That is, when the fine groove 10 is arranged so that a widthwise opening center $G_C$ is located within a range of 0.8 $TW_1$ to $0.9(TW_1+TW_2)$ separated from an equatorial plane O of the tire toward a side end of the first tread zone 7 as shown in FIGS. 3 and 4, if the tire is contacted onto the slant face as shown in FIG. 6, compression force $f_b$ generated through the bulging deformation bside acts to the fine groove 10 to thereby crush the side face of the fine groove at the outside of the tire and consequently the shearing deformation $S_S$ of the tread portion $T_r$ and hence camber thrust $F_C$ are increased.

In order to surely obtain the above action, it is necessary to ensure a region generating the shearing deformation $S_S$ in the fine groove 10 at the outside of the tire, so that it is important that the region of the shearing deformation $S_S$ is ensured over a length of not less than $0.1(TW_1+TW_2)$ by arranging the widthwise opening center $G_C$ of the fine groove 10 toward the equatorial plane O of the tire from a position of $0.9(Tw_1+TW_2)$ separated from the equatorial plane O to the end of the first tread zone 7.

As the position of the fine groove 10 becomes closer to the equatorial plane O of the tire, the region generating the shearing deformation $S_S$ is enlarged, but the compression force $f_b$ becomes weak apart from the tread end and the degree of the above deformation at the side face of the fine groove becomes small and hence the effect of arranging the fine groove is reduced. For this end, in the invention, the widthwise opening center $G_C$ of the fine groove is arranged toward the tread end from the position of 0.8 $TW_1$ separated from the equatorial plane O of the tire to the side end of the first tread zone 7.

In the tire according to the invention, it is liable to cause uneven wear starting from the tread end or so-called shoulder-falling wear, but the effect of preventing the development of the uneven wear toward the central zone of the tread can be expected by arranging the fine grooves 10 in the vicinity of the side end of the first tread zone 7 to divide the tread into plural parts. Further, it is effective to arrange the widthwise opening center $G_C$ of the fine groove toward the tread end from the position of 0.8 $TW_1$ separated from the equatorial plane O of the tire to the side end of the first tread zone 7 from a viewpoint of a necessity of widely ensuring the tread region not affected by the uneven wear in view of tire performances.

Even when the fine groove 10 is discontinuously extended in the circumferential direction of the tread, it is possible to obtain the above action, but it is more preferable that the fine groove is continuously extended in the circumferential direction. If the fine groove 10 is discontinuous, it is recommended to take a form as shown, for example, in FIGS. 5a and 5b. In this case, it is desirable that the fine groove 10 has a total projection length in circumferential direction corresponding to not less than ½ of full circumferential length of tread land portion in a region arranging the fine grooves. That is, in the tire shown in FIG. 5a, a sum of $\Sigma l_C$ of circumferential lengths $l_C$ of fine grooves 10 over a full circumference of the tread (total $\Sigma L_C$ in the tire shown in FIG. 5b) is desirable to be not less than ½ of full circumferential length of surface of tread land portion at the position arranging the fine grooves 10.

When the fine groove 10 is arranged in the vicinity of one end of the first tread zone 7, it is required to mount the tire onto a vehicle to locate this end of the first tread zone 7 having the fine grooves 10 at the outside of the vehicle.

The fine groove 10 is preferable to have a depth corresponding to not less than ½ of tread rubber gauge and an opening width of not more than 3 mm at the arranging position. When the depth of the fine groove 10 is less than ½ of the tread rubber gauge, the increase of the shearing deformation is small. On the other hand, the opening width is enough to enable the crushing deformation of the aforementioned side wall face of the groove, and if it is too wide, the tread surface area generating the camber thrust $F_C$ reduces, so that the opening width is restricted to not more than 3 mm.

Figure 7:
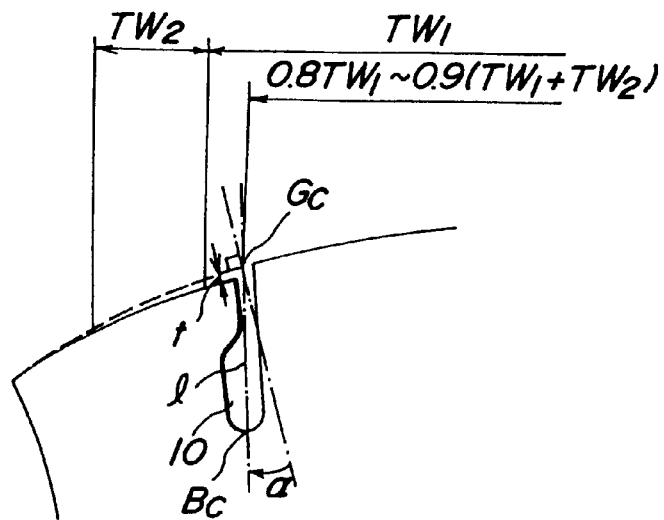
FIG. 7 is a diagrammatically enlarged view of a fine groove and its environs.

Similarly, it is favorable that the inside of the fine groove 10 is made wider than the opening width thereof as shown in FIG. 7. That is, the tread surface area generating the above camber thrust $F_C$ is ensured and also a space requiring the crushing deformation of the wide wall surface of the fine groove can be ensured by narrowing the opening width of the fine groove as compared with the inside thereof.

Figure 8:
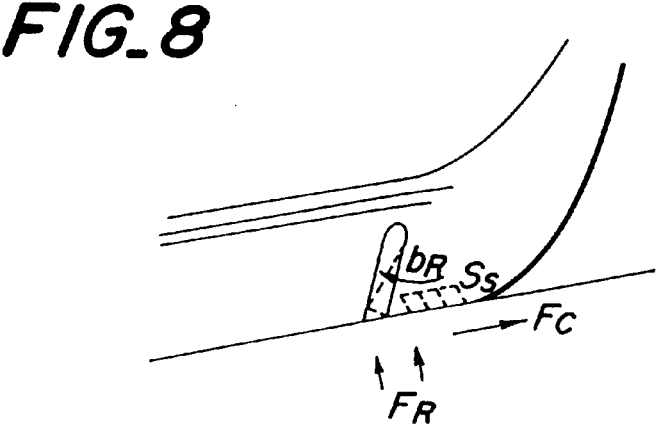
FIG. 8 is a radial section view illustrating a state of generating camber thrust.

Furthermore, it is preferable to arrange the fine groove 10 so that a phantom line segment 1 connecting the widthwise opening center $G_C$ of the fine groove 10 to a widthwise bottom center $B_C$ thereof at radial section of the tire is inclined at an angle $\alpha$ of not less than 5° with respect to a normal line of an outer surface of the tread drawn at the widthwise opening center outward from the widthwise opening center as shown in FIGS. 4 and 7. That is, when the bottom of the fine groove 10 is located at the outside of the tire as compared with the opening portion thereof, if reaction force $F_R$ is received from the road surface as shown in FIG. 8, the side wall surface of the fine groove generates the falling-down deformation $b_R$ to create a shearing deformation in the tread surface and hence the shearing deformation $S_S$ is increased together with the shearing deformation accompanied with the compression force $f_b$ as previously mentioned.

Moreover, it is favorable that a surface of an outer region in the widthwise direction of the tread bordering the fine groove 10 is located inward in the radial direction with respect to a surface of an inner region in the widthwise direction of the tread bordering the fine groove 10 in the tire tread inflated under a normal internal pressure as shown in FIGS. 4 and 7. That is, when a step difference t is formed between the inner region and outer region in the widthwise direction of the tread bordering the fine groove 10, the bending deformation bsho at the tread end becomes larger in correspondence with the step difference t and consequently the shearing deformation of the tread and hence the camber thrust $F_C$ can be increased. In addition, it is possible to suppress uneven wear in the inner region of the fine groove 10 in the widthwise direction of the tread.

Figure 9:
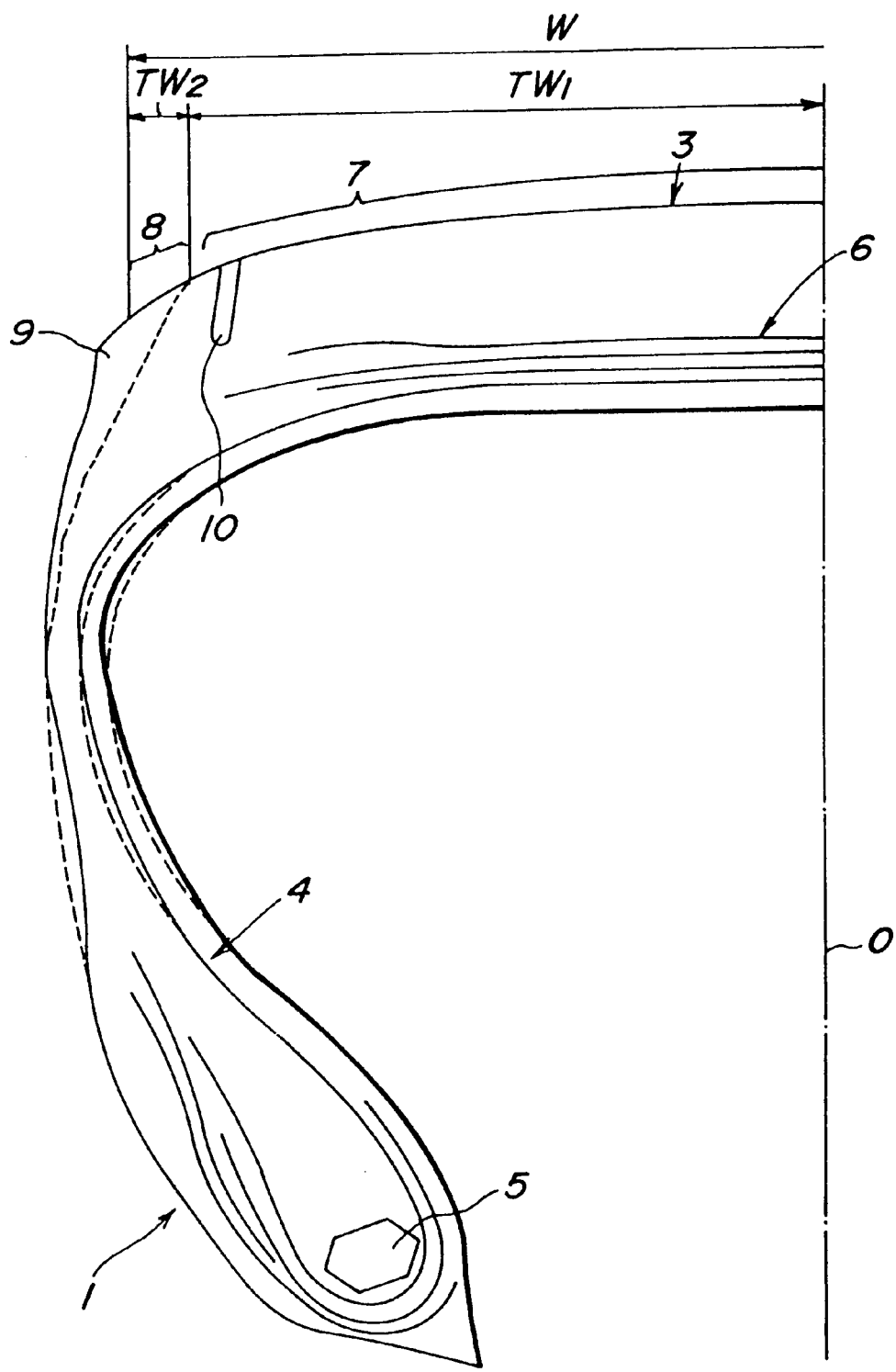
FIG. 9 is a diagrammatically radial left-half section view of another embodiment of the pneumatic radial tire according to the invention.

Although the practical embodiment of the pneumatic radial tire according to the invention is described with respect to a tire size of TBR 11R22.5 14PR shown in FIG. 3, it is applicable to a tire having a tire size of TBR 215/70 R17.5 shown in FIG. 9, in which a solid line is an invention tire and dotted lines are the conventional tire.

Incidentally, the invention tire shown in FIG. 3 has $TW_1 \times 2 = 185.0$ mm, $TW_2 = 9.6$ mm and $TW_2/TW_1 = 10.38 \times 10^{-2}$, while the conventional tire shown in the same figure has $TW_1 \times 2 = 185.0$ mm and $TW_2 = 0.0$ mm.

On the other hand, the invention tire shown in FIG. 9 has $TW_1 \times 2 = 167.0$ mm, $TW_2 = 8.0$ mm and $TW_2/TW_1 = 9.58 \times 10^{-2}$, while the conventional tire shown in the same figure has $TW_1 \times 2 = 167.0$ mm and $TW_2 = 0.0$ mm.

A comparison test between the invention tire (solid line) and the conventional tire (dotted lines) shown in FIG. 3 will be described with respect to the performance of controlling the wandering phenomenon below.

Test Tire

There are provided invention tires 1–3, comparative tires 1–3 and conventional tire having a tire size of 11R22.5 14PR and size dimensions shown in Table 1.

In the invention tires, an outer profile of the tread portion comprises an arc having a radius of curvature of 580 mm at a zone ranging outward from the equatorial plane of the tire to 62.8 mm in the widthwise direction thereof, an arc having a radius of curvature of 200 mm at a zone ranging to 62.8–91.5 mm outward from the equatorial plane in the widthwise direction and an arc having a radius of curvature of 40 mm at a remaining outer zone in the widthwise direction.

In this case, the first tread zone 7 is existent ranging outward from the equatorial plane of the tire to 91.5 mm in the widthwise direction thereof and the second tread zone 8 is existent outward from the first tread zone 7 in the widthwise direction.

On the other hand, the conventional tire has the tread portion comprised of only the first tread zone but has no second tread zone.

Test Method

Each of these tires is assembled into a rim of 7.50×22.5 and inflated under a normal internal pressure of 7.0 kgf/cm², and thereafter mounted onto a usual truck of 11.5 ton capacity (wheel arrangement: 2-D4). The truck is run on a paved road including ruts at a state of loading under a maximum authorized payload by a test driver, during which a straight running stability is feelingly evaluated.

The results are also shown in Table 1 by an index evaluation that the conventional tire is 100 (the larger the index value, the better the property).

As seen from this table, all of the invention tires can largely improve the straight running stability.

the second tread zone is a ground contact width extending outward from the half-width ($TW_1$) of the first tread zone in a widthwise direction at a maximum ground contact width from the equatorial plane of the tire on the flat road surface with a camber angle of 10° being applied to the tire under a normal loading in case of truck and bus tire and under a loading corresponding to 70% of a normal loading in case of tires having a size smaller than that of the truck and bus tire at an inflation state under a normal air pressure in accordance with the maximum loading capacity, and both widths ($TW_1$, $TW_2$) satisfy $TW_2/TW_1 > 2.0 \times 10^{-2}$, and further a fine groove continuously or discontinuously extending in the circumferential direction of the tread is arranged in at least

TABLE 1

| Tire | Tread width W (mm) | Second tread zone and reinforcing portion | Fine groove(*) Arranging position | Opening width/ width at depth of 6 mm | Shape | Index of straight running stability |
|---|---|---|---|---|---|---|
| Conventional tire | 185.0 | absence | | none | | 100 |
| Comparative tire 1 | 214.0 | presence | | none | | 145 |
| Invention tire 1 | 214.0 | presence | 0.84 ($TW_1 + TW_2$) (= 0.93 $TW_1$) | 2.5 mm/2.5 mm | FIG. 4 (t = 0 mm) | 163 |
| Invention tire 2 | 214.0 | presence | 0.84 ($TW_1 + TW_2$) (= 0.93 $TW_1$) | 1.0 mm/3.0 mm | FIG. 4 (t = 0 mm) | 168 |
| Invention tire 3 | 214.0 | presence | 0.84 ($TW_1 + TW_2$) (= 0.93 $TW_1$) | 1.0 mm/3.0 mm | FIG. 6(**) (t = 1.0 mm) | 182 |
| Comparative tire 2 | 214.0 | presence | 0.64 ($TW_1 + TW_2$) (= 0.70 $TW_1$) | 2.5 mm/2.5 mm | FIG. 4 (t = 0 mm) | 149 |
| Comparative tire 3 | 214.0 | presence | 0.93 ($TW_1 + TW_2$) (= 1.03 $TW_1$) | 2.5 mm/2.5 mm | FIG. 6(**) (t = 1.0 mm) | 132 |

(*)Fine groove: 10 mm in depth, inclination angle of widthwise opening center with respect to normal line on the outer surface of tread: 10°
(**)Groove width at a position of 5 mm inward from widthwise opening center in the radial direction of the tire increases form 1.0 mm to 3.0 mm.

As seen from the above, the pneumatic radial tires according to the invention can effectively control the occurrence of wandering phenomenon when they are applied to vehicles such as passenger car, small-size truck, truck and bus, and particularly can realize the excellent straight running stability even on road surfaces including ruts and the like during the high-speed running of the vehicle.

What is claimed is:

1. A pneumatic radial tire comprising; a pair of bead portions, a pair of sidewall portions, a tread portion toroidally extending between both sidewall portions, a radial carcass reinforcing said sidewall portions, and a belt reinforcing the tread portion at the outer circumferential side of the radial carcass, said tread portion comprising a first tread zone contacting a flat road surface and a second tread zone extending from a side of the first tread zone and contacting a mountain side of a slant road surface, and a half-width ($TW_1$) of the first tread zone is a maximum ground contact width from an equatorial plane of the tire on a flat road surface under a normal loading in case of truck and bus tire and under a loading corresponding to 70% of a normal loading in case of tires having a size smaller than that of the truck and bus tire at an inflation state under a normal air pressure in accordance with a maximum loading capacity according to the MATMA standard, and a width ($TW_2$) of the second tread zone is a ground contact width extending outward from the half-width ($TW_1$) of the first tread zone in a widthwise direction at a maximum ground contact width from the equatorial plane of the tire on the flat road surface with a camber angle of 10° being applied to the tire under a normal loading in case of truck and bus tire and under a loading corresponding to 70% of a normal loading in case of tires having a size smaller than that of the truck and bus tire at an inflation state under a normal air pressure in accordance with the maximum loading capacity, and both widths ($TW_1$, $TW_2$) satisfy $TW_2/TW_1 > 2.0 \times 10^{-2}$, and further a fine groove continuously or discontinuously extending in the circumferential direction of the tread is arranged in at least one of both side end vicinities of the first tread zone so that a widthwise opening center of the fine groove is located within a range of 0.8 $TW_1$ to 0.9 ($TW_1 + TW_2$) separated from the equatorial plane of the tire toward the side end of the first tread zone; and wherein a surface of an outer region of the tread in the widthwise direction bordering the fine groove is located inward in the radial direction with respect to a surface of an inner region of the tread in the widthwise direction bordering the fine groove.

2. A pneumatic radial tire according to claim 1, wherein the fine groove has a depth corresponding to not less than ½ of a tread rubber gauge at the fine groove arranged position and an opening width of not more than 3 mm.

3. A pneumatic radial tire according to claim 1, wherein a phantom line segment connecting the widthwise opening center of the fine groove to a widthwise bottom center thereof at radial section of the tire is inclined at an angle of not less than 5° with respect to a normal line of an outer surface of the tread drawn at the widthwise opening center outward from the widthwise opening center.

4. A pneumatic radial tire according to claim 1, wherein the fine groove has an inside width wider than the opening width.

* * * * *